Sept. 28, 1954      R. B. SEYMOUR      2,690,411
CORROSION-RESISTANT STRUCTURE
Filed Jan. 4, 1954
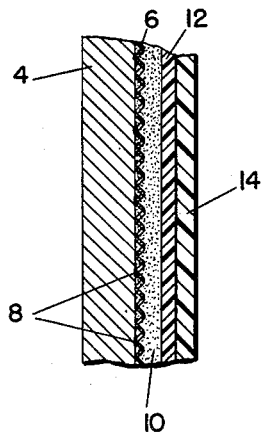
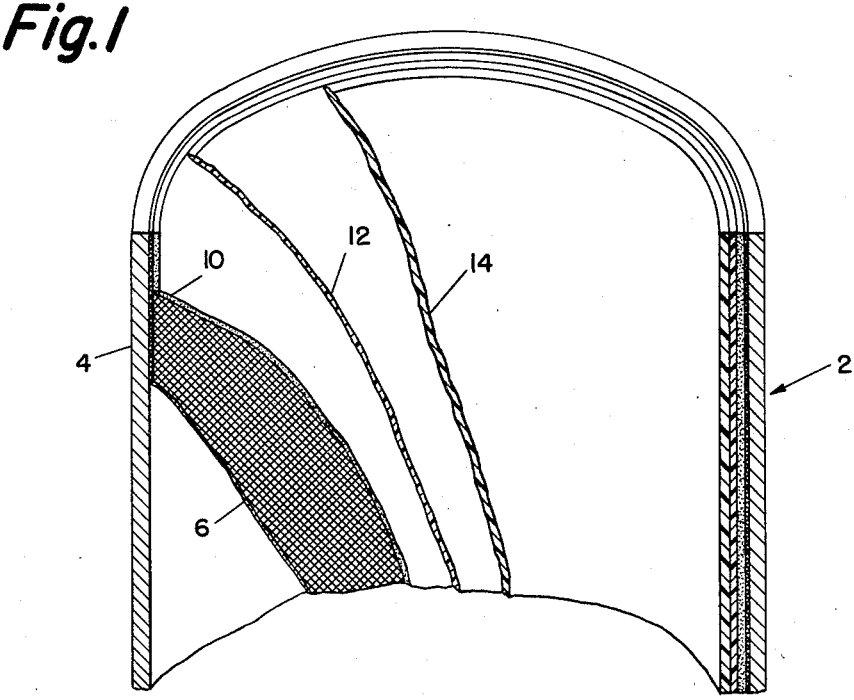
*INVENTOR.*
RAYMOND B. SEYMOUR
BY *Busser Smith + Hardy*
ATTORNEYS Patented Sept. 28, 1954

2,690,411

UNITED STATES PATENT OFFICE 2,690,411

CORROSION-RESISTANT STRUCTURE

Raymond B. Seymour, Emmaus, Pa., assignor to The Atlas Mineral Products Company of Pennsylvania, Mertztown, Pa., a corporation of Pennsylvania Application January 4, 1954, Serial No. 401,910

1 Claim. (Cl. 154—43)

This invention relates to a corrosion-resistant structure and more particularly relates to a structure having a metal wall having a corrosion-resistant lining.

The industrial need for corrosion-resistant structures, as, for example, in the petroleum refining industry, is very great. The problem has been particularly acute where, for reasons of structural strength and ease of construction, it is desired to employ steel walls. This is exemplified by columns required by the petroleum refining industry as, for example, so-called flasher columns where the walls are subjected to various corrosive substances such as solvents and acidic materials. Frequently in such applications the problem is complicated by changing temperature conditions and the necessity for high temperatures.

The numerous factors involved have militated against the development of structures which are satisfactory for sustained periods of operation. Indeed, the solution to date has been such that corrosion has been accepted as a severe business expense as evidenced by the wide use of cladding with various alloy steels, which construction is relatively short lived and very expensive. Attempts to solve the problem through the use of linings of various types of cement have not been very successful. In the first place, many of the most desirable cements will not adhere to steel. Where the cement will adhere to the steel wall, the differential of expansion between the cement and the steel wall leads to cracking of the cement lining. Nor will a single cement provide adequate resistance to different types of corrosive influences.

The structure in accordance with this invention overcomes the above generally outlined problems. The invention comprises a solid supporting structure of metal of satisfactory structural strength for the application such as, for example, steel, which is provided with a lining. The lining comprises superimposed layers of a silicate cement, an unsaturated polyester resin and a furan resin. A metal mesh or grate such as, for example, expanded metal, is tack welded to the supporting structure. The silicate cement is then forced through the grate up against the metal supporting structure, filling all the interstices between the mesh or grate, and troweled over the mesh or grate so as to cover it. After the silicate cement has set, the unsaturated polyester resin is troweled over the silicate cement and permitted to set. The furan resin is then troweled over the polyester resin and permitted to set.

The mesh or grate will preferably be made of steel and can conveniently be expanded metal. It has been found to be highly satisfactory to have openings whose width is ½" to 2" and height is in the range of from ¼" to 1". It is satisfactory to tack weld the mesh or grate on from 3 to 24 inch centers, although wide variations are inherent depending upon the circumstances such as, for example, the diameter of the column involved.

It is preferred to use a sodium silicate cement which is readily formed from sodium silicate solution mixed with a silica aggregate and an acid setting agent, such as sodium silico-fluoride, paratoluyl sulfonyl chloride. By way of further example, it is satisfactory to use a sodium silicate solution having a specific gravity varying from 30 to 44° Bé. with a ratio of from 2 to 3.9 parts of $SiO_2$ to 1 part of $Na_2O$; a silica aggregate in an amount of from 100 to 300% by weight of the silicate solution and an acid setting agent in an amount of 2 to 10% by weight of the silicate solution. Other silicates, such as, for example, $K_2SiO_3$ may also be used. It is desirable to use in the cement an additional inert filler, such as, for example, silica, asbestos or ground glass fibers. Reference may be had to "Soluble Silicates in Industry" by James G. Vail, Chemical Catalog Co., New York City.

The unsaturated polyester resin may be, for example, any resin having a substantially 100% polymerizable mix of a liquid polyhydric alcohol ester of an ethylene alpha-beta-dicarboxylic acid and a liquid monomeric unsaturated polymerizable compound in which the unsaturation is due to a single terminal ethylenic group which is attached to a negative radical in which the ester aforesaid is soluble and with which it is copolymerizable in the presence of a peroxy polymerization catalyst. Reference may be had to "Modern Plastics Encyclopedia," published by Plastics Catalogue Corp., 122 E. 42nd Street, New York 17, N. Y., for typical polyester resins and the manner of their production. Thus, a composition comprising a substantially linear polyhydric alcohol ester of an unsaturated polybasic acid material of the maleic type and a substituted-ethylene body of resin forming characteristics which are copolymerizable and miscible with the polyhydric alcohol ester can be used. Thus, for example, the composition may be diethylene glycol maleate or diethylene glycol fumarate or ethylene glycol phthalate having incorporated therewith vinyl acetate, amyl acrylate, styrene or cyclopentadiene.

The curing of such a maleic substituted ethylene composition will be accelerated by using a curing catalyst such as benzoyl peroxide, phthalyl peroxide or air blown dioxane. Such thermosetting resins are well known in the art and reference may be made to Patent No. 2,255,313, issued September 9, 1941, to Carleton Ellis for further information relative to them. Reference may also be had to British Patents Nos. 540,168 and 540,169 for other exemplary polyester resins.

A promoter such as N-ethyl or tetraethylene pentamine may be used. Such promoters are well known, as will be seen by reference to, for example, U. S. Patents Nos. 2,578,690, 2,449,299 and 2,452,669. Metal salts of organic acids such as cobalt driers may also be used with these resins as promoters. For example, polyester resins having a specific gravity of 1.1 to 1.46, a refractive index of 1.53 to 1.57 and a specific volume of 19 to 25.2 cubic inches per pound are satisfactory.

The polyester resin will preferably be filled with an inert filler, such as carbon, silica, asbestos or barytes.

The following are exemplary of readily available commercial polyester resins: Laminac sold by the American Cyanamid Co., MR resins sold by Celanese, Paraflex sold by Rohm & Haas, Plaskon sold by the Barrett Division of Allied Chemical & Dye, Selectron by Pittsburgh Plate Glass and Vibrin sold by Naugatuck Division of U. S. Rubber.

The furan resin in accordance with this invention may be, for example, a polyfurfuryl alcohol resin, a furfuryl alcohol-formaldehyde resin, a furfuryl alcohol-furfural resin. A furfural-ketone copolymer, such as the reaction product of furfural and acetone, is further exemplary. These resins can be cured at room temperature with acids having an ionization constant of $1.4 \times 10^{-4}$ or higher, as is well known in the art. Bodied furfuryl alcohol as disclosed in U. S. Patent No. 2,366,049 is satisfactory.

The invention will be further clarified by reference to the drawings, in which:

Figure 1, which is partially broken away, shows an embodiment of this invention in a column.

Figure 2 is an enlarged vertical section, partially broken away, of the structure of Figure 1.

As shown in the figures, a column 2 has a solid supporting structure 4 of steel. The expanded metal 6 is tack welded to supporting structure 4 as indicated at 8. Silicate cement 10 abuts against supporting structure 4 and extends through and beyond expanded metal 6. A layer of unsaturated polyester resin 12 overlies the silicate cement 10. A furan resin layer 14 overlies the unsaturated polyester resin layer 12.

It has been found that the resultant structure does not crack even under very adverse temperature change conditions. It appears likely that the expanded metal, or other equivalent mesh or grate structure succeeds in relieving the stresses due to differential coefficient of expansion between the steel and the lining. Further, the invention permits the use of a furan resin as the outermost lining layer, which would appear to be a meritorious advance in that furan resins do not satisfactorily adhere to steel or a silicate cement. The lining is of great utility in that it is highly corrosion-resistant to a wide range of corrosive material, such as, for example, 50% sulfuric acid, 35% hydrochloric acid, 85% phosphoric acid, 40% sodium hydroxide, 20% sodium chloride, gasoline, benzene and carbon tetrachloride.

It is not desired to be limited except as set forth in the following claim, the above description being by way of illustration only.

What is claimed is:

A new article of manufacture comprising a solid metal supporting structure, a metal mesh secured to said supporting structure, a silicate cement overlying said mesh and filling the interstices in the mesh, an unsaturated polyester resin overlying the silicate cement and a furan resin overlying the polyester resin.

References Cited in the file of this patent

UNITED STATES PATENTS

| Number | Name | Date |
|---|---|---|
| 1,767,421 | Wirth | June 24, 1930 |
| 2,274,189 | Congleton | Feb. 24, 1942 |
| 2,448,397 | Schilling et al. | Aug. 31, 1948 |
| 2,459,018 | Demonte et al. | Jan. 11, 1949 |
| 2,577,618 | Jayne et al. | Dec. 4, 1951 |
| 2,653,118 | Seymour | Sept. 22, 1953 |